R. CRAIK.
MIDDLINGS PURIFIERS.
No. 7,884. Reissued Sept. 11, 1877.
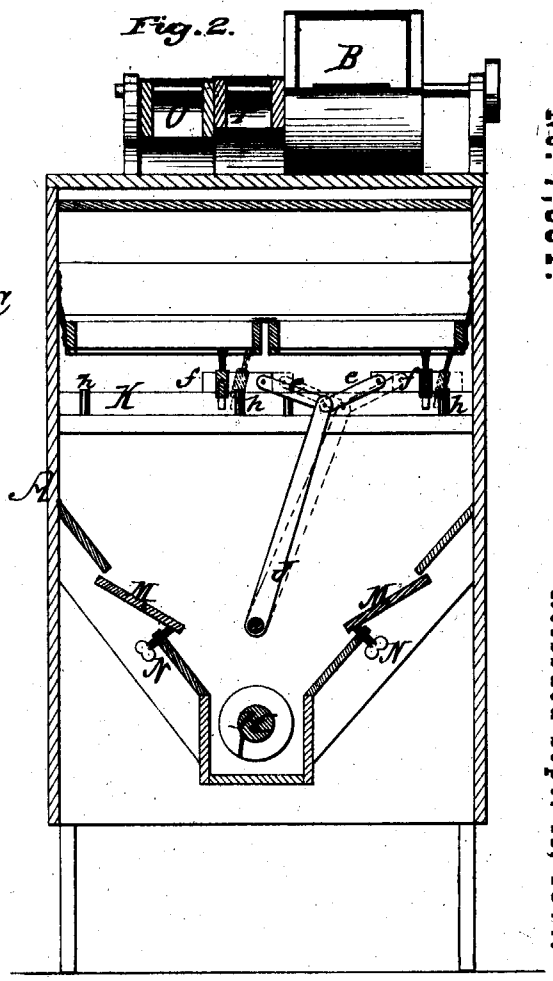
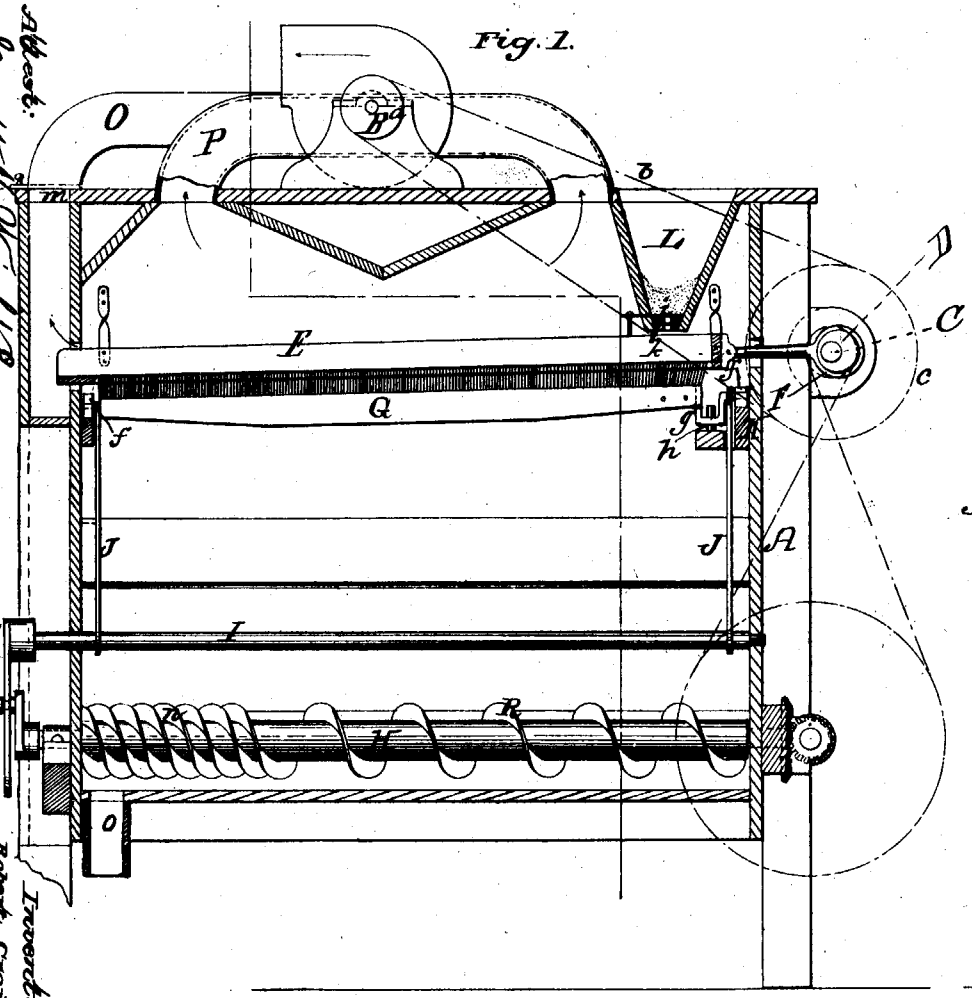
Attest:
James M. Wright Jr.
A. H. Norris.
Inventor:
Robert Craik.
by
James L. Norris
Attorney
THE NORRIS PETERS CO., PHOTO-LITHO., WASHINGTON, D. C.

UNITED STATES PATENT OFFICE.

ROBERT CRAIK, OF CATARACT, WISCONSIN.

IMPROVEMENT IN MIDDLINGS-PURIFIERS.

Specification forming part of Letters Patent No. 143,887, dated October 21, 1873; Reissue No. 7,884, dated September 11, 1877; application filed August 28, 1877.

*To all whom it may concern:*

Be it known that I, ROBERT CRAIK, formerly of Money Creek, Houston county, State of Minnesota, but now of Cataract, in the county of Monroe and State of Wisconsin, have invented certain new and useful Improvements in Middlings-Purifiers, of which the following is a specification:

This invention relates to that class of apparatus known as middlings-purifiers, wherein the middlings remaining after the superfine flour has been separated from the ground wheat, &c., are passed through such apparatus to produce a very fine quality of flour.

My invention consists, essentially, in the combination, with a reciprocating riddle or shaker, of a brush moving transversely across the entire under surface of the riddle, and independently of the movement of the latter, whereby the mixture of the fine middlings with the coarser grade is effectually prevented, by reason of the brush not being liable to carry such fine middlings, which sift through to the ends of the screen, where the coarse middlings or bran-stuff pass off.

My invention also consists in the combination of knockers or cleaners with said transversely-arranged brushes, for the purpose of cleaning the brushes of fine middlings at each end of their stroke.

The invention also embodies certain other features, which will be fully hereinafter described.

In the accompanying drawings, Figure 1 is a longitudinal vertical section of my improved middlings-purifiers, and Fig. 2 is a transverse vertical section of the same.

In the accompanying drawings, A represents the closed frame of the machine, which also carries the operating parts of the apparatus. B represents a suction-fan, which is revolved by means of a pulley, *a*, and a belt, *b*, passing around a pulley, *c*, on the shaft C, which latter is provided with a cam, D, which reciprocates the riddle, shaker, or screen E, said cam moving in a yoke, F, which is attached to the end of the riddle or shaker. G represents the brushes, which are caused to traverse the entire under surface of the screen, in a transverse direction across the same, and are moved by mechanism entirely independent of the movement of the screen. This mechanism, in the example shown, consists of the crank *d* on the end of the conveyer-shaft H, the lever G, and rock-shaft I, and the rocking levers J, attached at their upper ends to the ends of the brush-frames by rods *e e*, and at their lower ends to the rock-shaft I, which is oscillated or rocked by the crank *d* and lever G′.

The ends of the brush-frames are pivoted in boxes *f*, which slide on transverse bars K, attached to the frame A, and the pivotal arms of said brushes are bent, as at *g*, to form projections, so that when the brushes reach the end of their stroke the projections or cleaners *g* will abut against the knockers *h*, which act as cleaners to the brushes, and thereby knock out the middlings from the latter, and serve to effectually clean the same for their return movement, thereby always keeping the brushes prefectly clean.

L represents the feed-hopper, and *i* is an adjustable perforated slide, which is vibrated by means of its connection with the riddle, shaker, or screen; and under this slide is the bottom *k*, which is perforated to correspond with the slide *i*, whereby the said perforated bottom is automatically and alternately opened and closed to feed in the middlings.

The suction-fan causes the air to pass up through the bolts from the openings in the division-boards M, which are secured together by set-screws N, whereby they can be adjusted toward or from each other to increase or decrease the openings between such boards, and thereby regulate the admission of air. O represents a tube, connected with one end of the frame A, and communicating with the suction-fan at its other end, so as to draw off the air, and hence the bran and light stuff, from the ends of the shakers; and P represents a pipe, communicating with the suction-fan at its center, and at its ends with the interior of the casing or frame above the shakers, for drawing off the dust, bran, &c., from above the shakers or screens. The tube O is provided with a valve, *m*, for regulating the draft, and consequent passage of the light bran, &c.

R represents the conveyer, for carrying off the purified middlings, said conveyer being constructed with a series of secondary flights, *n*, at one end, and by which means the middlings are carried to the discharge-opening *o* of the machine in a uniform, even, and gradual manner.

It will be seen from the foregoing description that the brushes sweep across the under side of the reciprocating shaker, riddle, or screen in a transverse direction independently of the movement of the said screen, and at right angles to the material in its passage over the same, whereby a mixture of the finer with the coarser grade of middlings is entirely avoided, which will occur where the brushes move in the direction of the length or longitudinally along the under side of the screen.

The cause of the mixing of the different grades of middlings is due to the brushes traveling longitudinally, or in the direction of the riddle, shaker, or screen, the brushes carrying the finer middlings with them in their longitudinal movement to the end of the screen, and mixing them with the coarse middlings, which pass off at the end of the screen; but, as is evident, by having the brushes moving transversely across the under surface of the riddle or shaker independently of the movement of said riddle, the mixing of the different grades of middlings is effectually prevented, for the reason that the brush does not have an opportunity to carry the fine middlings along, but permits it to fall directly through the screen.

Having thus described my invention, what I claim, and desire to secure by Letters Patent, is—

1. The combination, with a reciprocating riddle or shaker, of a brush moving transversely across the entire under surface of the riddle, and independently of the movement of the latter, substantially as and for the object set forth.

2. In combination with a suction-fan, a reciprocating riddle or shaker and a brush moving transversely across the entire under surface of the riddle independent of the movement of the latter, substantially as and for the purpose set forth.

3. The combination, in a middlings-purifier, of a riddle, shaker, or screen, a brush extending longitudinally along the under side of said riddle or shaker, and independent mechanism, such substantially as set forth, for reciprocating the shaker and moving the brush transversely across the entire under surface of the latter independently of the movement of the same.

4. The combination of knockers or cleaners with a brush arranged to move transversely across the under side of a reciprocating screen, and independently of the movement of the latter, substantially as and for the purpose described.

5. The conveyer G, having a series of secondary flights for feeding the middlings evenly to the discharge-opening, substantially as described.

In testimony whereof I have hereunto set my hand.

ROBERT CRAIK.

Witnesses:
S. S. FIELD,
JOHN MOFFATT.